Patented Mar. 5, 1935

1,993,563

UNITED STATES PATENT OFFICE 1,993,563

VEHICLE WHEEL

Philip M. Miller and Richard B. Miller, Detroit, Mich.

Application December 24, 1931, Serial No. 582,934

3 Claims. (Cl. 301—9)

This invention relates to wheels for motor vehicles and is particularly but not necessarily concerned with wheels of the cast metal type.

The primary object of the invention is to provide an improved type of hub and nave construction for metal wheels. More specifically, the invention contemplates the provision of a wheel having a nave and spoked spider member formed of relatively soft malleable metal, and a hub proper, or hub barrel, of relatively hard metal capable of effectively supporting a bearing or of being splined to a driven axle, the hub and nave being so associated that the wheel may be detached from the hub with comparative ease should it be desired to replace either one of the parts.

Another object of the invention is to provide a wheel having a skeleton nave structure which together with the outer spoked body is formed of relatively soft malleable metal, and a hub member of relatively hard metal associated or connected with said nave member in a manner such that the torque and lateral thrust stresses will be transmitted to the skeleton nave structure with a minimum liability of breakage.

Figure 1:
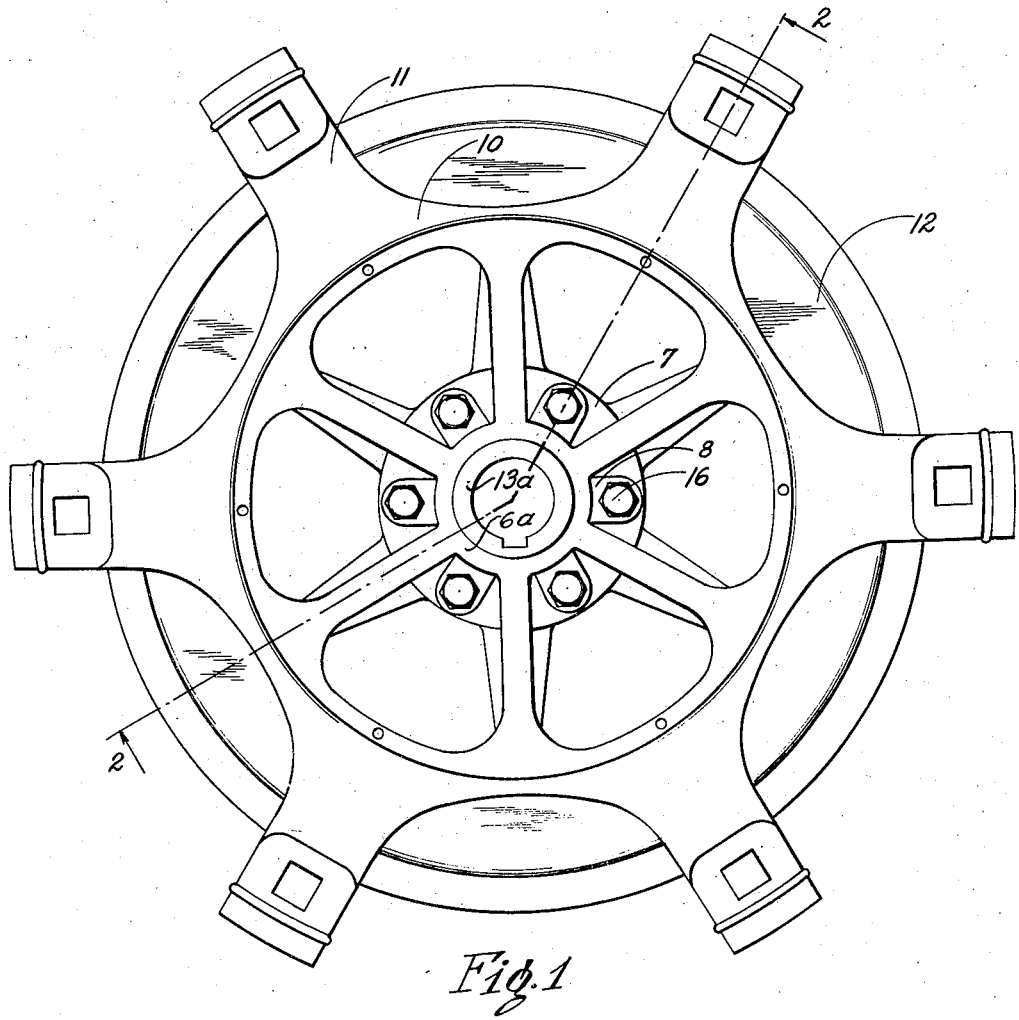
Figure 2:
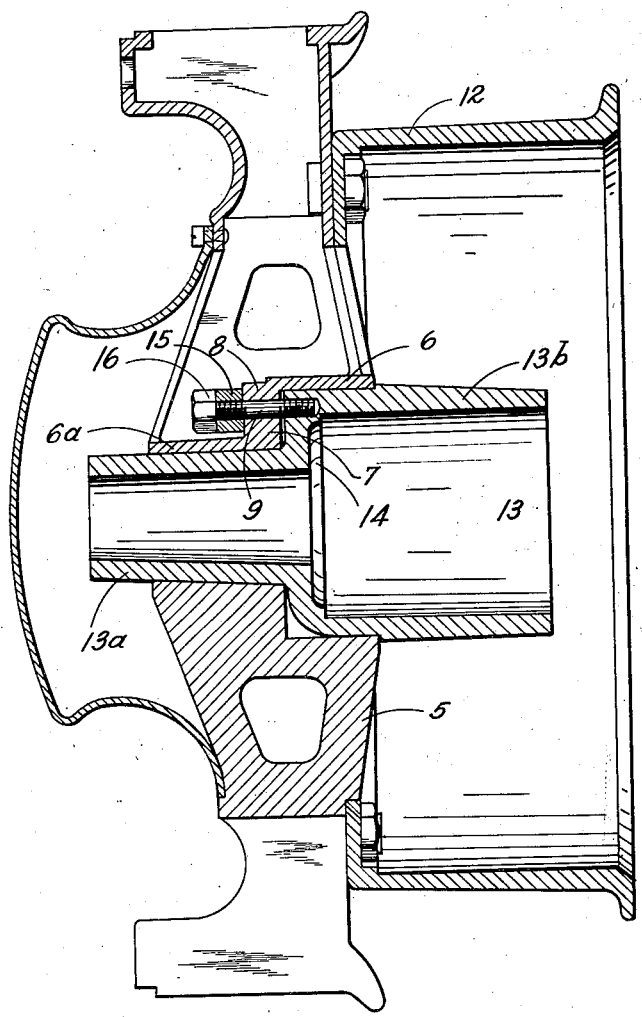

The foregoing and other objects and advantages will become apparent from the following description taken in conjunction with the drawings, wherein:

Figure 1 is a view in outboard side elevation of a wheel of the cast metal type embodying the features of the invention; and Fig. 2 is a sectional view taken on the line 2—2, Fig. 1.

Referring to the drawings in detail, the wheel proper preferably comprises an integral casting of malleable iron or like metal capable of being readily cast at the foundry. The nave of the wheel is preferably of skeleton construction and consists of a series of radially projecting ribs 5, which merge at their inner ends with central tubular hub-receiving portions 6 and 6a, which are joined by a radial inset or bolting-on shoulder 7. The portion 6a, as shown, is tapered and has built up thereon radial reinforcing lugs or bosses 8. The bosses 8 together with the bolting-on shoulder 7 are bored to receive a plurality of studs or pins 9, which will again be referred to.

The ribs 5 are preferably of such transverse dimensions as to adequately reinforce the wheel against lateral thrust stresses, and at their outer ends merge with a body wall 10, which is projected radially at spaced points defining a plurality of relatively short stubby spokes 11, this part of the wheel being of substantially the same type as that shown and described in the copending application of Philip M. Miller Serial No. 542,619, filed June 6, 1931. The spoke ends, as here shown, are arranged for dual tire rims, but obviously could be of the single rim type. A brake drum 12 is secured to the inboard side of the wheel body at the base of the spokes, said drum preferably having a relatively short web to render the body wall more rigid and cooperate with the latter to reinforce the wheel as a whole.

The hub proper, or hub barrel, is generally indicated at 13 and consists of a forging or other hard metal composition adapted to be keyed to an axle shaft, not shown. This hub member is formed with a radial inset wall or shoulder 14 which joins the tapered axle-receiving portion 13a of the hub with the inner bearing-receiving portion 13b. The wall or shoulder 14 is formed with a plurality of threaded holes in which the studs of pins 9 are anchored.

In assembling the hub barrel or hub proper with the wheel, the hub is preferably given a pressed fit in the tubular portions 6 and 6a of the nave, the studs or pins 9 being passed through registering holes in the bolting-on shoulder 7 and bosses 8 and nuts 15 threaded thereon and tightened down, after which lock nuts 16 are applied to ensure against loosening. Thus the two parts are connected one to the other in a manner such that the torque thrust as well as the lateral thrust stresses are equally distributed throughout the skeleton nave of the wheel, thereby materially reducing the liability of breakage at this point. In the event it is desired to replace either one of the parts, they may be separated one from another with comparative ease. A hub construction of this type is particularly advantageous for cast spider members of the type shown herein in which the nave portion is made up of a plurality of ribs which project radially for the greater area of the wheel diameter in order to reduce the amount of metal in the wheel and permit the use of relatively short spokes.

It will be understood that certain modifications and changes in structure may be adopted within the scope of the invention as defined by the appended claims.

We claim:

1. In a metal wheel assembly for motor vehicles, a spider member formed of malleable metal and having a central axial nave opening, the wall of said opening being formed with a radial shoulder, and a hub barrel of hardened metal formed with a bearing-housing portion and an axle-receiving portion, the wall of said barrel between said portions being inset radially to fit against said shoulder, and means for demountably bolting said shoulder to said inset hub wall.

2. In a metal wheel assembly for motor vehicles, a spider member formed of malleable metal and having a central axial nave opening, the wall of said opening being formed with a radial inset portion defining a shoulder, and a hub barrel of hardened metal formed with a bearing-housing portion and an axle-keying portion, the wall of the barrel between said portions being inset radially to fit against said shoulder, and a plurality of studs extended axially through said shoulder and threaded in said inset wall of the barrel for demountably holding the parts in assembled relation.

3. In a metal wheel assembly for motor vehicles, an artillery type spider member of malleable metal having a nave portion of open ribbed construction and an axial opening, the peripheral wall of said opening being formed with a radial inset defining a bolting-on shoulder, and a hub barrel of hardened metal formed with a bearing-housing portion and an axle-keying portion, the wall of said barrel between said portions being inset radially to fit against said shoulder, and a plurality of demountable studs extended through said bolting-on shoulder between the ribs of the nave portion and threaded into the inset wall of said hub barrel.

PHILIP M. MILLER.
RICHARD B. MILLER.